United States Patent [19]

Miles

[11] Patent Number: 5,342,105

[45] Date of Patent: Aug. 30, 1994

[54] RAMP AND ENDGATE FOR PICKUP TRUCK

[76] Inventor: Mark R. Miles, 6865 Buckingham Rd., Woodbury, Minn. 55125

[21] Appl. No.: 73,748

[22] Filed: Jun. 8, 1993

[51] Int. Cl.$^5$ ............................................. B62D 25/00
[52] U.S. Cl. ..................................... 296/61; 296/57.1
[58] Field of Search .................. 296/50, 51, 57.1, 61, 296/62

[56] References Cited

U.S. PATENT DOCUMENTS

| | | | |
|---|---|---|---|
| 365,657 | 6/1887 | Watson | 296/61 |
| 967,181 | 8/1910 | Giermann . | |
| 2,727,781 | 12/1955 | D'Eath | 296/61 |
| 2,767,016 | 10/1956 | Wood | 296/61 X |
| 3,265,433 | 8/1966 | Shea . | |
| 4,353,589 | 10/1982 | Hartberg | 296/50 |
| 4,735,454 | 4/1988 | Bernard | 296/61 |
| 4,795,304 | 1/1989 | Dudley | 296/61 X |
| 4,944,546 | 7/1990 | Keller | 296/61 |
| 5,133,584 | 7/1992 | McCleary | 296/61 |

FOREIGN PATENT DOCUMENTS 63117  7/1892  Fed. Rep. of Germany ........ 296/61

OTHER PUBLICATIONS

Drawing Showing Prior Art Ramp and Endgate for Pickup Truck.

*Primary Examiner*—Joseph D. Pape
*Attorney, Agent, or Firm*—James W. Miller

[57] ABSTRACT

A convertible endgate is provided for a pickup truck which endgate has an elevated endgate forming position and a lowered ramp forming position. The endgate includes front and rear sections pivotally connected together and to the box of the pickup truck. The rear section is more steeply inclined, and the front section is shallower, when the sections are placed in their lowered ramp forming position. Vertically adjustable latches are carried on one of the sections for latching the sections in place in their elevated endgate forming position. The latches are vertically adjustable on slide members and the slide members are vertically adjustable on the frame members of the section. The terminal end of the rear section, i.e. the end which engages a horizontal planar surface when the endgate is disposed in its lowered ramp forming position, includes an L-shaped support member having a horizontal support surface for resting flat against the ground and having a free edge for digging into a bed of a flatbed trailer.

20 Claims, 4 Drawing Sheets

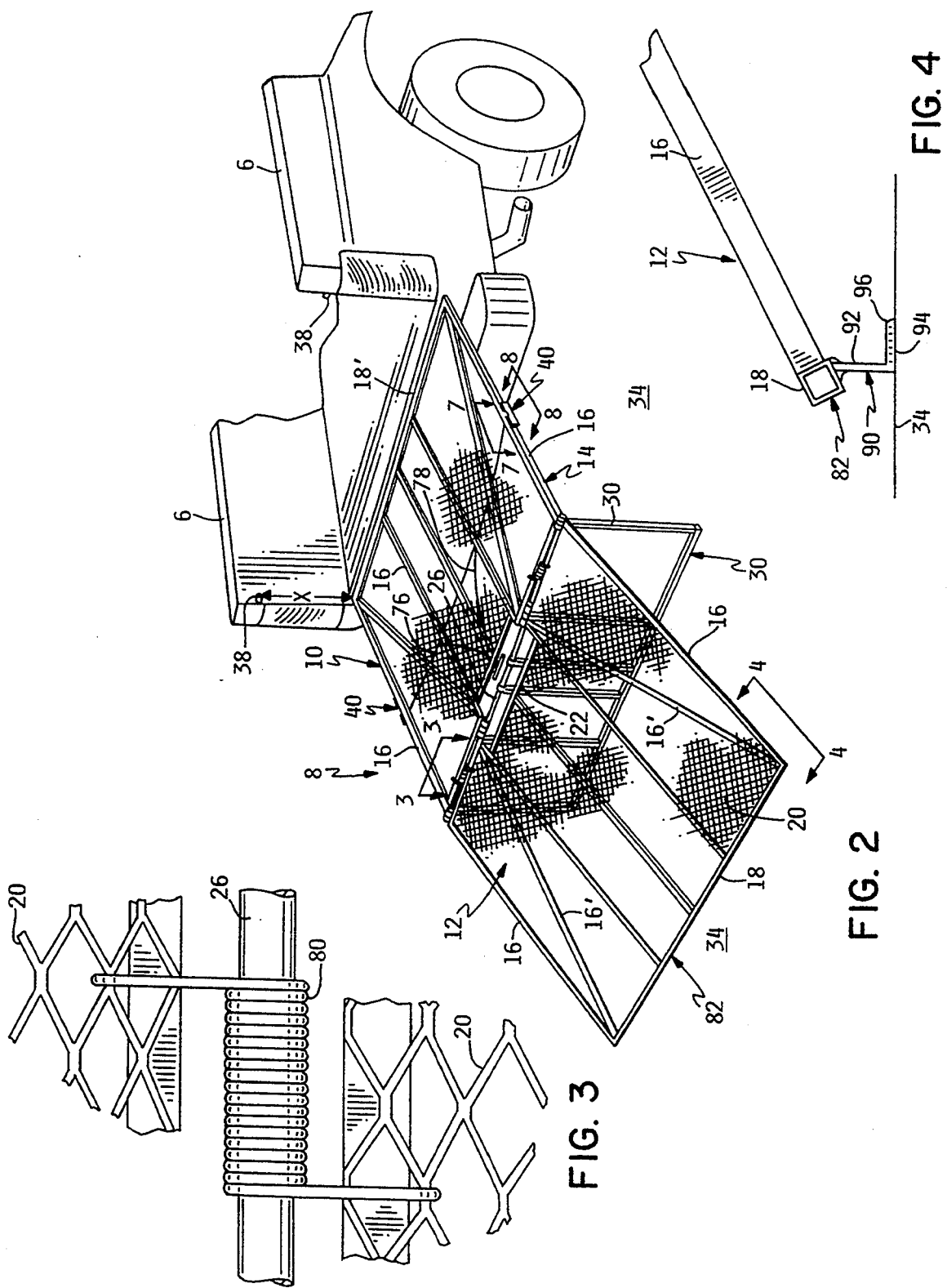

RAMP AND ENDGATE FOR PICKUP TRUCK

TECHNICAL FIELD

This invention relates to a pickup truck having a load carrying box which includes a pivotal endgate at the rear of the box for closing the box. More particularly, this invention relates to an endgate for a pickup truck which can be disposed to extend down to the ground to form a ramp for loading supplies or equipment into the truck box.

BACKGROUND OF THE INVENTION

Pickup trucks are well known. They comprise a vehicle having a cab for seating a number of passengers and a generally open bed or box which extends rearwardly from the cab to the rear of the vehicle. The box forms a cargo space for carrying many types of items or materials. The rear end of the box is enclosed by a pivotal endgate which is pivotal between one of two positions. The first position is an upright latched position in which the endgate extends across the rear of the box and serves to enclose and form the rear end of the box. The second position is a horizontal position in which the endgate has been folded down to allow access to the truck box.

It is often desirable to use the box of a pickup truck to carry various items of outdoor power equipment, such as lawnmowers, snowblowers or the like. Many truck boxes are large enough to carry even small riding lawnmowers or tractors. The purpose of loading such items in the truck is to transport them over relatively long distances, e. g. between job sites in the case of someone who is in the business of cutting grass, etc. It is difficult, if not impossible, to load a riding lawnmower or the like into the truck when the truck is equipped with the original equipment endgate.

Various endgates have been proposed for pickup trucks which convert into a ramp to ease the task of loading vehicular and other equipment into the truck box. For example, U.S. Pat. No. 2,727,781 to D'Eath discloses a sectional endgate that when folded out forms an inclined ramp extending downwardly to the ground. This allows easier loading of equipment and the like into the truck box. For example, riding lawnmowers and the like could simply be driven up the ramp and into the box when the ramp is folded down.

While ramps that also serve as endgates are known for use on pickup trucks, the currently existing products of this type have various disadvantages. For example, the manufacturers of pickup trucks use different types of latch mechanisms located at different heights for use in latching their original equipment endgates. In the past, each endgate that was convertible into a ramp has been manufactured with a locking means located at the appropriate height for mating with the latch mechanism for a particular model of truck. Thus, different endgates had to be manufactured for different models of trucks in order to properly locate the locking means at the proper heights. This is obviously disadvantageous in that many different models of endgates had to be manufactured and stocked.

Furthermore, prior convertible endgates were relatively heavy and difficult to unfold and position. Moreover, the prior art endgates converted into ramps forming a single inclined surface extending at the same angle relative to the ground. If a riding lawn mower was being loaded into the truck box, the constant, relatively steep pitch as the mower was being driven up the ramp and into the truck box made it difficult to see into the truck box and to properly maneuver the mower into the truck box. This could be unnerving and even dangerous, particularly for an unskilled or inexperienced operator. Finally, many of the handle assemblies for releasing the locking means in prior art convertible endgates were inconveniently located and difficult to operate.

SUMMARY OF THE INVENTION

These and other aspects of the invention are provided by a combination endgate and ramp structure for pickup trucks. The endgate comprises front and rear sections pivotally secured together for relative pivotal movement therebetween about a first transverse pivot axis. A means is provided for pivotally mounting the front section to a rear end portion of a truck box to permit movement of the front and rear sections about a second transverse pivot axis between an elevated gate forming position and a lowered ramp forming position. The sections when in their elevated gate forming position are folded up to be disposed in an adjacent face-to-face relationship and when in their lowered ramp forming position are disposed end-to-end extending downwardly and rearwardly from the truck box. A means is carried on one of the sections for releasably locking the front and rear sections in their elevated gate forming position, the locking means being cooperable with a portion of a locking mechanism located on the truck box. The locking means is vertically adjustable along the one section whereby the position of the locking means on the one section may be vertically adjusted to adjust to different elevational positions of the locking mechanism portion on the truck box.

Another aspect of the present invention relates to the configuration of the front and rear sections in their lowered ramp forming position. Specifically, the front and rear sections form different angles relative to a horizontal plane when the front and rear sections are disposed in their lowered ramp forming position with the front section extending between the truck box and the rear section and the rear section extending down to a ground surface from the front section. Preferably, the rear section is more steeply inclined than the front section.

BRIEF DESCRIPTION OF THE DRAWINGS

This invention will be described hereafter in the following Detailed Description taken into conjunction with the following drawings, in which like referenced numerals refer to like elements or parts throughout.

FIG. 2 is a partial perspective view of the pickup truck shown in FIG. 1, but one which illustrates the convertible endgate being disposed in its lowered ramp forming position to serve as a loading ramp extending between the truck box and the ground;

FIG. 3 is a top plan view of a portion of the endgate taken along lines 3—3 in FIG. 2, particularly illustrating a spring for biasing the sections of the endgate to counterbalance the weight thereof when the endgate is being folded out into its lowered ramp forming position shown in FIG. 2;

FIG. 4 is a side elevational view of a portion of the endgate shown in FIG. 2 taken along lines 4—4 of FIG. 2, particularly illustrating a support member disposed at the rear of the endgate to help support the endgate on the ground;

FIG. 9 is a side elevational view of a portion of the endgate similar to the view of FIG. 4, particularly illustrating the support member disposed at the rear of the endgate in engagement with the bed of a flatbed trailer or the like.

DETAILED DESCRIPTION

Figure 1:
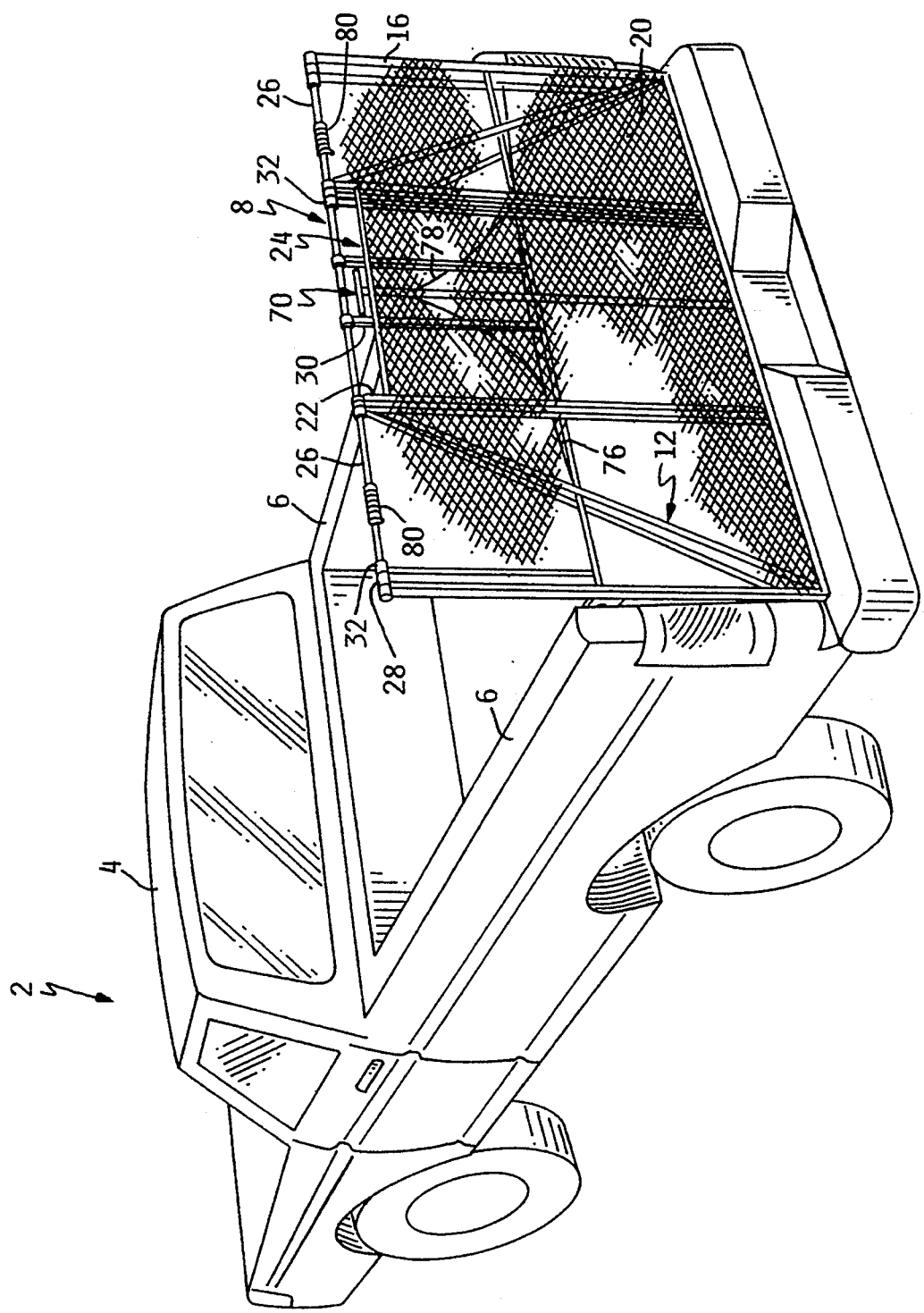
FIG. 1 is a perspective view of a pickup truck equipped with the convertible ramp forming endgate of this invention, the endgate being shown in its elevated, folded up, endgate forming position.

Referring now to FIG. 1, a pickup truck is generally illustrated as 2. Truck 2 may be any conventional pickup truck having a passenger cab 4 in which the driver and one or more passengers may be seated. In addition, truck 2 includes an open bed or truck box 6 which extends between cab 4 and the rear of truck 2. Truck box 6 forms a generally rectangular storage space for carrying equipment or materials of almost any type. Typically, an original equipment endgate (not shown) forms the rear side of box 6 and is pivotal to move from an open, horizontal position to a folded up, vertical position in which the rear of truck box 6 is enclosed.

This invention relates to an endgate 8 which is convertible into an inclined ramp for ease of loading of equipment or materials into truck box 6. As such, convertible endgate 8 of this invention replaces the usual endgate which is provided as original equipment on truck 2. As will be apparent hereafter, convertible endgate 8 of this invention is not limited for use with a particular type of truck 2. Indeed, one aspect of this invention is to provide an endgate 8 which is specially designed to fit a wide variety of pickup trucks.

An endgate 8 according to this invention includes two sections, namely a front section 10 and a rear section 12, which are pivotally connected together. From a structural standpoint, the construction of each section 10 or 12 is generally identical. Each section 10 or 12 includes a frame 14 which is made from a plurality of longitudinal and transverse frame members 16 and 18, respectively. Frame members 16 and 18 are welded together to form a rigid rectangular frame 14 in which the various frame members are spaced apart to form open areas extending between the frame members. These open areas are covered with a perforate mesh 20 formed by heavy, metallic screen material which is connected to and extends between frame members 16 and 18.

Frame members 16 and 18 provide rigidity to each section 10 or 12. Mesh 20 allows each section 10 or 12 to serve as a load bearing surface while decreasing the weight and air resistance of endgate 8. As shown in FIG. 2, some of the longitudinal frame members 16, identified as 16', desirably form diagonal cross braces which further rigidify and enhance the strength of each section 10 or 12.

One feature of each section 10 or 12 is that the top edge 22 of section 10 or 12, i.e. the edges of sections 10 or 12 which are pivotally connected together, are not formed merely of a single, straight transverse frame member 18. Instead, as shown most clearly in FIG. 1, the middle portion of edge 22 is vertically spaced or offset slightly below the other portions of edge 22 to form a cutout portion 24. This further increases the strength of section 10 or 12 since the non-linear top edge 22 formed from transverse frame members 18 welded together and including cutout portion 24 is stronger than if the top transverse frame member 18 were purely straight. In addition, cutout portions 24 form a convenient space or opening for providing access to a portion of the handle means used to unlatch endgate 8, as will be described in more detail below.

With respect to front section 10, the transverse frame member 18 forming the lower edge of this section, identified as 18' in FIG. 2, is shaped and notched to be pivotally received in the endgate bearing areas that are typically provided in the body of truck 2 for the original equipment endgate. In other words, the lowermost transverse cross member 18' of front section 10 interfits with truck 2 in the same pivotal manner that the usual endgate does to form a transverse pivot axis for front section 10 relative to truck 2. This allows front section 10 of endgate 8, and hence the entire endgate 8, to be pivotal relative to truck 2. In most cases, transverse cross member 18' allows endgate 8 to be slipped onto and off of truck 2 in the same manner as the original equipment endgate provided on most modern pickup trucks 2.

Figure 6:
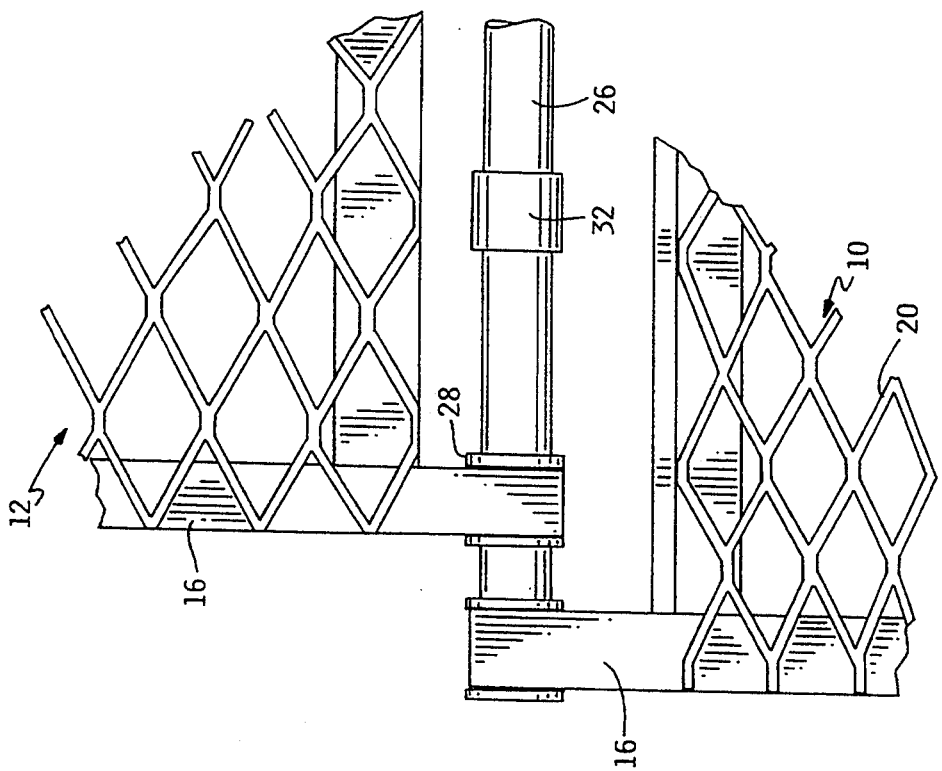
FIG. 6 is a partial top plan view of a portion of the endgate shown in FIG. 1, particularly illustrating the pivot connections between the various sections of the endgate.

Referring now to FIGS. 1, 2 and 6, a transverse pivot shaft 26 is located at the mating edges of the front and rear sections 10 and 12 to allow sections 10 and 12 to pivot relative to one another. For example, as shown in FIG. 6, the upper edge of front section 10 has the tops of its longitudinal frame members 16 welded or otherwise fixed to transverse pivot shaft 26. The upper edge of rear section 12 includes circular sleeves or bearings 28 at the top of certain of its longitudinal frame members 16 for pivotally journalling rear section 12 of endgate 8 on pivot shaft 26. In addition, a short transverse support frame 30 is also provided which is normally sandwiched between front and rear sections 10 and 12 of endgate 8 when these sections are disposed in their elevated endgate forming position. Support frame 30 is also pivotally carried on pivot shaft 26, again by having various circular sleeves or bearings 32 at the top thereof which are pivotally journalled on pivot shaft 26. However, any suitable means for pivoting front and rear sections 10 and 12 together, and for pivoting support frame 30 relative to sections 10 and 12, could be used.

As shown in FIG. 1, endgate 8 has an elevated gate forming position in which endgate 8 serves as the normal endgate for the pickup truck. Endgate 8 is pivotal between this position and a lowered ramp forming position in which sections 10 and 12 of endgate 8 are placed end-to-end to form an inclined ramp which leads from box 6 of truck 2 downwardly to a ground surface 34. In this lowered ramp forming position as shown in FIG. 2, support frame 30 assumes a generally vertical orientation in which it engages the ground to help support front and rear sections 10 and 12 as they function as a ramp. Thus, when endgate 8 is placed into its lowered ramp forming position as shown in FIG. 2, it forms a strong and stable ramp by which equipment and supplies can be more easily loaded into truck box 6. For example, riding lawnmowers or tractors can be driven up the ramp and into truck box 6, or the user can use the ramp to walk up into box 6 while carrying various types of loads.

One aspect of this invention is that endgate 8 is designed to have the front and rear sections 10 and 12 disposed at different angles to the horizontal when sections 10 and 12 are arranged in their lowered ramp forming position. Desirably, front section 10 is less steeply inclined, i.e. is shallower relative to the horizontal, than rear section 12. Applicant has found that this non-coplanar ramp configuration contributes to safety as it is easier for an operator to see as he drives a vehicle up the ramp and into truck box 6, thus making it easier to maneuver and position the vehicle in box 6.

Another feature of this invention is the use of an adjustable locking means or latch for latching endgate 8 in its elevated endgate forming position of FIG. 1. In this regard, the normal endgate latching mechanism used in truck box 6 often includes inwardly extending latch pins 38 located at a particular vertical distance above the bed of truck 2. These latch pins 38 are illustrated in FIG. 2 at a first particular elevation denoted as x. Many types of pickup trucks have such latch pins 38 which cooperate with a latch provided on the original equipment endgate. However, as between different models of pickup trucks 2, it is not uncommon that the vertical elevation x of these latch pins can change significantly, on the order of six inches or so.

Figure 7:
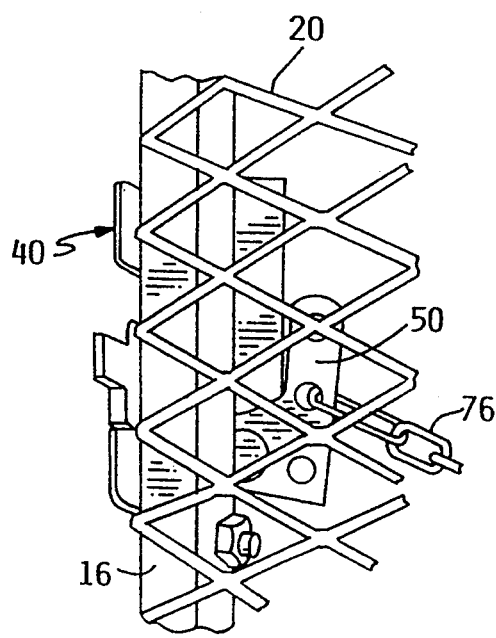
FIG. 7 is a partial bottom plan view of one type of latch used on the endgate to engage with a portion of the latch mechanism provided on the truck box, particularly illustrating the chain extending from the release lever of the latch to the handle assembly shown in FIG. 5.
Figure 8:
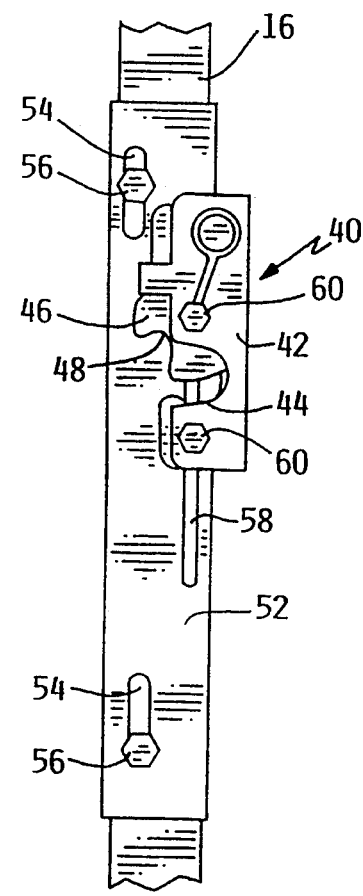
FIG. 8 is a partial side elevational view of the latch shown in FIG. 7, particularly illustrating the use of a slide member to adjustably attach the latch to the endgate for the purpose of vertically varying the location of the latch.

Referring now to FIGS. 7 and 8, endgate 8 of this invention uses a locking means comprising a latch illustrated generally as 40. Latch 40 includes a latch frame 42 having a latch opening 44 into which latch pin 38 is to be received. Latch 40 further includes a pivotal latch member 46 having a semicircular recess 48 for abutting against latch pin 38 on truck 2. When endgate 8 is closed relative to truck box 6, latch pin 38 will engage recess 48 in latch member 46 to pivot latch member 46 from its open position shown in FIG. 8 to a closed position. In this closed position, latch member 46 is pivoted counterclockwise approximately 90° to restrain latch pin 38 in latch opening 44 with latch pin 38 being captured between latch opening 44 on one side and the recess 48 in latch member 46 on the other side. In this closed position, endgate 8 will be securely affixed to truck 2 and will not be capable of being opened relative thereto.

To open latch 40, a release lever 50 is provided on latch frame 42 to pivot latch member 46 back to its open position shown in FIG. 8. Layer 50 is itself illustrated in FIG. 7. Latch 40 as illustrated in FIGS. 7 and 8 herein is a conventional latch which is used for door locking purposes in various types of vehicles. One example of this type of latch 40 is one which is manufactured and sold by Eberhard Company, known as the Series 450 Clasp Latch.

Each side of front section 10 is provided with a latch 40 for mating with the two inwardly protruding latch pins 38 provided on the opposed left and right sides of truck box 6. However, latch 40 is not directly mounted to the longitudinal frame members 16 that form each side of section 10. Instead, each latch 40 is carried on an elongated slide member 52. Slide member 52 is itself vertically adjustable up and down on the longitudinal frame member 16 through the use of elongated vertical adjustment slots 54 which receive bolts 56 extending from frame member 16. Bolts 56 can be selectively loosened to allow slide member 52 to be vertically adjusted along the length of slots 54, and then bolts 56 can be retightened to lock or clamp slide member 52 in place. Thus, some vertical adjustment of the position of latch 40 is permitted simply by moving slide member 52 up and down on frame member 16.

However, the range of travel required to move slide member 52 sufficiently far to reposition latch 40 from the highest possible location of latch pin 38 to the lowest possible location of pin 38, given the wide variation in pin location between different truck models, would require slots 54 that are very long which would weaken slide member 52 unduly. Accordingly, it is preferred that latch 40 also be vertically adjustable on slide member 52. More specifically, latch 40 is vertically adjustable up and down on slide member 52 through the use of a vertically elongated adjustment slot 58 provided in slide member 52. The shanks of one or more threaded bolts 60 provided on latch frame 42 extend through slot 58 to vertically guide latch 40 along slot 58. Latch 40 is held or locked in place on slide member 52 by the nuts (not shown) which are threaded onto the outer ends of bolts 60 and which when tightened will clamp latch 40 in place on slide member 52.

As a result, the vertical position of latch 40 can also be adjusted on slide member 52 by moving latch 40 from one end of adjustment slot 58 to the other. The combination of being able to vertically move latch 40 relative to slide member 52, and to vertically move slide member 52 relative to frame member 16, provides sufficient adjustability in the height of latch 40 to adapt to the entire range of elevations of latch pin 38 known in existing pickup trucks, all without weakening the strength of slide member 52.

Latch 40 as shown in FIGS. 7 and 8 is of a type having a pivotal latch member 46 which is suited for latching around generally circular latch pins 38 of the type shown in FIG. 2. Some pickup trucks are provided with a different latch mechanism in which the sides of box 6 are provided with a hole or aperture which can receive a reciprocal latch member that slides into and out of that hole or aperture. The pivotal latch 40 shown in FIGS. 7 and 8 could be replaced with such a reciprocal, slide type latch having a latch member that slides transversely in and out relative to frame member 16 and the side panels of truck box 6. Because the holes which receive these slideable latch members are also located at different vertical elevations x in truck box 6, the latch frame of such a slide type latch member is also desirably mounted in vertical slots in a slide member 52 with slide member 52 itself being vertically adjustable on frame member 16, in a manner similar to that already described for slide member 52.

Figure 5:
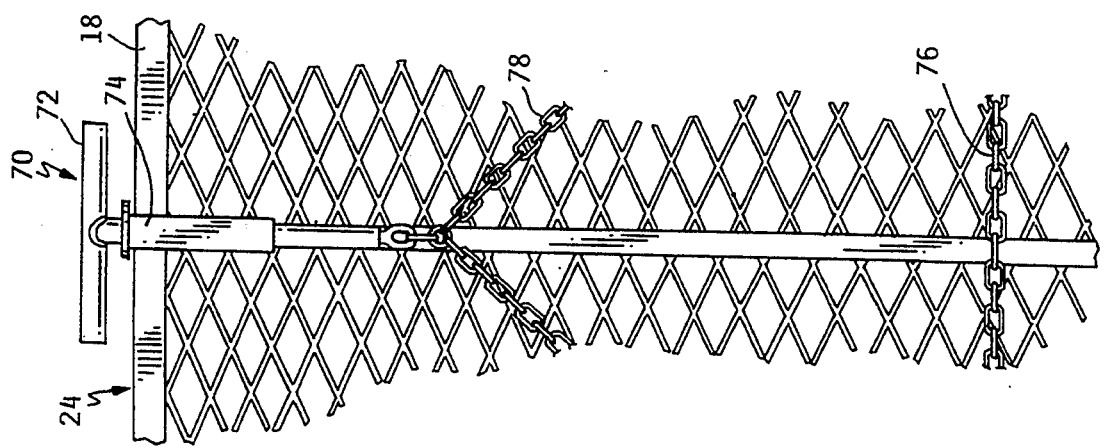
FIG. 5 is a partial top plan view of a portion of one of the sections of the convertible endgate shown in FIG. 1, particularly illustrating the handle assembly used for operating the latches of the endgate.

Regardless of which style of latch is used, endgate 8 includes a central handle means 70 for actuating latches 40 on either side of endgate 8. Referring to FIGS. 1, 2 and 5, handle means 70 includes a simple T-shaped handle 72 which is received in a cylindrical socket 74 located in the middle of front section 10 at the top thereof. When endgate 8 is folded up into its elevated endgate forming position as shown in FIG. 1, the transverse handle portion of handle 72 is located adjacent the top edge 22 of front section 10 in the cutout portions 24 of front and rear sections 10 and 12 so as to be easily accessible. Accordingly, the user can insert his hand into cutout portions 24 to reach handle 72, and actuates handle 72 by pulling up on handle 72.

The lower portion of handle 72 is provided with an elongated flexible means extending to latches 40 for actuating the same. This flexible means comprises a first cross chain 76 extending transversely across endgate 8 and connecting to the two pivotal release levers 50 carried on latches 40. In addition, the flexible means 74 further comprises a connecting chain 78 having an inverted, generally V-shaped orientation and extending between the lower end of handle 72 and the middle of cross chain 76. When the operator wishes to unlatch endgate 8, he merely places his hand into cutout portions 24 and pulls upwardly on handle 72. This pulls upwardly on the connecting chain 78 to pull upwardly simultaneously on the middle portion of cross chain 76, thereby causing the ends of cross chain 76 to retract inwardly to pull levers 50 of latches 40 inwardly to thereby pivot latch members 46 and unlatch endgate 8. Endgate 8 can then be placed into its lowered ramp forming position shown in FIG. 2.

Any suitable motion transmitting mechanism extending between the lower end of handle 72 and levers 50 could be used in place of chains 76 and 78. For example, actuating cables could run vertically down from handle 72 and be wound around a central pin or arbor located in the middle of front section 10 before extending off to the sides to reach latches 40. Accordingly, the precise type of motion transmitting mechanism that is used is not important to the present invention.

In order to assist the user in unfolding endgate 8, the pivot shaft 26 extending between front and rear sections 10 and 12 includes a plurality of counterbalance springs 80. These springs 80 are wrapped about shaft 26 and have their ends extending outwardly and connected into the mesh 20 of the front and rear sections 10 and 12, respectively. See FIG. 3. These springs are positioned to counterbalance the weight of sections 10 or 12 as endgate 8 is being lowered so that not all of the weight is borne directly by the operator. This helps facilitate the use of endgate 8.

Referring now to FIG. 4, the terminal edge 82 of rear section 12 of endgate 8, namely that edge which is formed by a transverse frame member 18 and is designed to engage the ground when the endgate is disposed in its lowered ramp forming position, is provided with an L-shaped support member 90 having a vertical surface 92 and a horizontal surface 94. Support member 90 is welded or otherwise fixedly secured across the length of terminal edge 82 on the underside of terminal edge 82. In addition, support member 90 is oriented relative to terminal edge 82 such that its horizontal surface 94 is adapted to rest substantially flat on the ground surface 34 when endgate 8 is placed into its lowered ramp forming position and terminal edge 82 engages ground surface 34. See FIG. 4. This helps to firmly support endgate 8 when it is being used as a ramp and equipment is being driven up the ramp.

Figure 9:
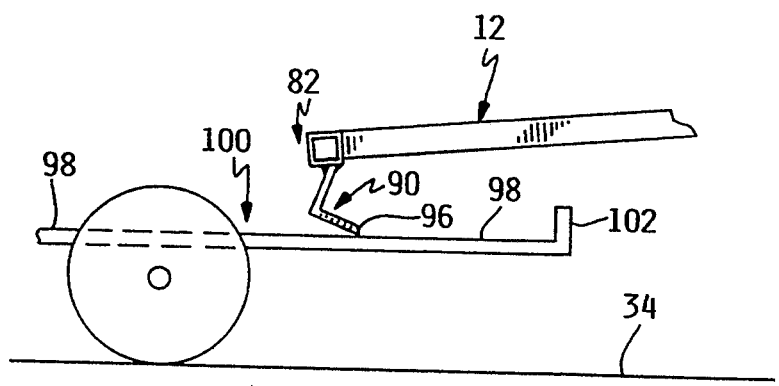

However, support member 90 is also formed and oriented such that the free edge 96 of horizontal surface 94 is useful when rear section 12 of endgate 8 is not abutted directly against the ground in its ramp forming position, but when rear section 12 is laid out onto the bed 98 of a flatbed trailer 100 of the type which is often used to carry mowing equipment such as riding mowers. In this case, as shown in FIG. 9, the free edge 96 of support member 90 will be located at a downwardly facing, inclined angle tending to bite into bed 98 of trailer 100. Some trailers even have lips 102 at the ends of the trailer and free edge 96 can also hook or abut against these lips. In any event, whether free edge 96 is arranged to dig down into the bed 98 of trailer 100 or to hook against a lip thereon, free edge 96 helps to securely retain rear section 12 in place relative to trailer 100. This further enhances the stability and safety of endgate 8 when it is being used to load equipment directly from a trailer 100 into truck box 6.

Convertible endgate 8 of this invention has numerous advantages. It can be easily retrofitted and adapted to almost all existing pickup trucks with latches 40 being repositionable along the sides thereof by virtue of the adjustability provided by slide members 52. In addition, it is strong and durable with the arrangement of frame members 16 and 18 and cutout portions 24 in sections 10 or 12 providing great strength and durability. Moreover, it uses a central vertically moving handle 72 to operate latches 40 which handle can be easily reached and operated even when sections 10 or 12 are in their elevated endgate forming position. Accordingly, endgate 8 of this invention is simple, durable and easy to use.

Various modifications of this invention will be apparent to those skilled in the art. Thus, the scope of the invention shall be limited only by the appended claims.

I claim:

1. A combination endgate and ramp structure for pickup trucks, which comprises:
   front and rear sections pivotally secured together for relative pivotal movement therebetween about a first transverse pivot axis, means pivotally mounting the front section to a rear end portion of a truck box to permit movement of the front and rear sections about a second transverse pivot axis between an elevated gate forming position and a lowered ramp forming position, the sections when in their elevated gate forming position being folded up to be disposed in an adjacent face-to-face relationship and when in their lowered ramp forming position being disposed end-to-end extending downwardly and rearwardly from the truck box, and means carried on one of the sections for releasably locking the front and rear sections in their elevated gate forming position, the locking means being cooperable with a portion of a locking mechanism located on the truck box, the locking means being vertically adjustable along the one section whereby the position of the locking means on the one section may be vertically adjusted to adjust to different elevational positions of the locking mechanism portion on the truck box.

2. An endgate and ramp structure as recited in claim 1, wherein the truck box has opposed left and right sides and is provided with a locking mechanism portion on each of the left and right sides, wherein the one section has opposed left and right sides and is provided with a locking means on each of its left and right sides to lock the left and right sides of the one section relative to the truck box, and wherein each locking means on each side of the one section is vertically adjustable along the one section.

3. An endgate and ramp structure as recited in claim 2, wherein the locking means includes a movable locking member carried on a frame, wherein each side of the one section includes a slide member on which the frame of the locking means is slidably carried such that the frame of the locking means can be slid up and down in a vertical direction to vertically reposition the locking means on the one section.

4. An endgate and ramp structure as recited in claim 3, wherein the slide member is provided with at least one vertically extending slot, and wherein the frame of the locking means includes a pin extending into the slot such the frame of the locking means can be repositioned by moving the pin within the slot, and further including means for locking the pin in an adjusted position within the slot.

5. An endgate and ramp structure as recited in claim 3, wherein the slide member is itself slidably carried on the side of the one section to increase the amount of the vertical adjustment allowed for the locking means without weakening the slide member, whereby the total vertical adjustment of the locking means is provided by the range of motion allowed for the slide member relative to the one section and by the range of motion allowed for the frame of the locking means relative to the slide member.

6. An endgate and ramp structure as recited in claim 2, wherein the first pivot axis of the front and rear sections forms an upper edge of the sections when the sections are disposed in their elevated gate forming position, and further including handle means located adjacent the upper edge of the sections operatively connected to the locking means on each side of the one section for simultaneously releasing the locking means when the handle means is manipulated, whereby the locking means may conveniently be released from a position close to the upper edge of the front and rear sections when such sections are disposed in their elevated gate forming position.

7. An endgate and ramp structure as recited in claim 6, wherein the handle means comprises a handle mounted on the one section for vertical upward movement when releasing the locking means, and flexible motion transmitting means operatively connecting the locking means and the handle.

8. An endgate and ramp structure as recited in claim 7, wherein the front and rear sections each have a cutout portion arranged adjacent the upper edge formed when the front and rear sections are disposed in their gate forming position, and wherein the handle is located in the cutout portions of the front and rear sections to be easily accessible.

9. An endgate and ramp structure as recited in claim 8, wherein the cutout portions of the front and rear sections are located over a middle portion of each of the front and rear sections, the cutout portions being generally identically located on each of the front and rear sections so as to overlie one another when the front and rear sections are folded up into their elevated gate forming position.

10. An endgate and ramp structure as recited in claim 1, wherein the front and rear sections are formed of spaced apart, elongated frame members affixed together to form a rectangular frame, and further including perforate mesh material extending between and affixed to the frame members for creating a relatively open section through which wind can pass through the mesh material.

11. An endgate and ramp structure as recited in claim 1, wherein the front and rear sections form different angles relative to a horizontal plane when the front and rear sections are disposed in their lowered ramp forming position with the front section extending between the truck box and the rear section and the rear section extending down to a ground surface from the front section, and wherein the rear section is more steeply inclined than the front section.

12. An endgate and ramp structure as recited in claim 1, wherein the rear section has a terminal end adapted for engaging a ground surface when the front and rear sections are disposed in their lowered ramp forming position, the terminal end including a horizontal support surface which is so oriented relative to the terminal end such that the horizontal support surface will rest substantially flat against the ground surface when the terminal end is in engagement with the ground surface.

13. An endgate and ramp structure as recited in claim 12, wherein the terminal end of the rear section includes a free edge which forms a downwardly inclined angle relative to a horizontal bed of a trailer when the rear section of the endgate is laid onto the trailer bed rather than the ground surface, the inclined angle being sufficient to allow the free edge to dig down into the trailer bed to help retain the rear section in place against the trailer bed.

14. An endgate and ramp structure as recited in claim 13, wherein the terminal end of the rear section includes a substantially L-shaped support member having a first surface secured to an underside of the terminal end and a second surface connected to the first surface by approximately a 90° angle, the second surface of the support member forming the horizontal support surface and the second surface of the support member having a free distal end forming the free edge.

15. An endgate and ramp structure as recited in claim 1, further including biasing means for counterbalancing the weight of the front and rear sections when the front and rear sections are being disposed in their lowered ramp forming position.

16. An endgate and ramp structure as recited in claim 13, wherein the biasing means comprises at least one spring carried on the first transverse pivot axis, the spring having opposite ends connected respectively to the first and second sections.

17. A combination endgate and ramp structure for pickup trucks, which comprises:

front and rear sections pivotally secured together for relative pivotal movement therebetween about a first transverse pivot axis, means pivotally mounting the front section to a rear end portion of a truck box to permit movement of the front and rear sections about a second transverse pivot axis between an elevated gate forming position and a lowered ramp forming position, the sections when in their elevated gate forming position being folded up to be disposed in an adjacent face-to-face relationship and when in their lowered ramp forming position being disposed end-to-end extending downwardly and rearwardly from the truck box, wherein the first transverse pivot axis of the front and rear sections forms an upper edge of the sections when the sections are disposed in their elevated gate forming position;

means carried on one of the sections for releasably locking the front and rear sections in their elevated gate forming position, the locking means being cooperable with a portion of a locking mechanism located on the truck box; and handle means located adjacent the upper edge of the sections operatively connected to the locking means for simultaneously releasing the locking means when the handle means is manipulated, wherein the handle means comprises a single handle mounted on the one section for vertical upward movement when releasing the locking means, whereby the locking means may conveniently be released from a position close to the upper edge of the front and rear sections when such sections are disposed in their elevated gate forming position simply by pulling upwardly on the single handle.

18. An endgate and ramp structure as recited in claim 17, wherein the truck box has opposed left and right sides and is provided with a locking mechanism portion on each of the left and right sides, wherein the one section has opposed left and right sides and is provided with a locking means on each of its left and right sides to lock the left and right sides of the one section relative to the truck box, and further including flexible motion transmitting means operatively connecting each of the locking means to the single handle.

19. An endgate and ramp structure as recited in claim 17, wherein the front and rear sections each have aligned cutout portion is arranged adjacent the upper edge formed when the front and rear sections are disposed in their gate forming position, and wherein the handle is located in the aligned cutout portions of the front and rear sections to be more easily accessible.

20. A combination endgate and ramp structure for pickup trucks, which comprises:

front and rear sections pivotally secured together for relative pivotal movement therebetween about a first transverse pivot axis, means pivotally mounting the front section to a rear end portion of a truck box to permit movement of the front and rear sections about a second transverse pivot axis between an elevated gate forming position and a lowered ramp forming position, the sections when in their elevated gate forming position being folded up to be disposed in an adjacent face-to-face relationship and when in their lowered ramp forming position being disposed end-to-end extending downwardly and rearwardly from the truck box;

means carried on one of the sections for releasably locking the front and rear sections in their elevated gate forming position, the locking means being cooperable with a portion of a locking mechanism located on the truck box; and biasing means for counterbalancing the weight of the front and rear sections when the front and rear sections are being disposed in their lowered ramp forming position, wherein the biasing means comprises at least one spring carried around the first transverse pivot axis, the spring having opposite ends connected respectively to the first and second sections.

* * * * *